United States Patent
Schurter et al.

(10) Patent No.: US 10,602,678 B2
(45) Date of Patent: Mar. 31, 2020

(54) ORCHARD CLIMATE CONTROL SYSTEM

(71) Applicant: S&W INGENIERIA AGRICOLA Y PROPIEDAD INTELECTUAL SPA, Santa Cruz (CL)

(72) Inventors: Anibal Schurter, Santa Cruz (CL); John Warmerdam, Hanford, CA (US)

(73) Assignee: S&W Ingenieria Agricola y Propiedad Intelectual SPA, Santa Cruz (CL)

( * ) Notice: Subject to any disclaimer, the term of this patent is extended or adjusted under 35 U.S.C. 154(b) by 451 days.

(21) Appl. No.: 15/356,257

(22) Filed: Nov. 18, 2016

(65) Prior Publication Data
US 2017/0064913 A1    Mar. 9, 2017

Related U.S. Application Data

(63) Continuation-in-part of application No. PCT/US2015/031842, filed on May 20, 2015.

(60) Provisional application No. 62/001,026, filed on May 20, 2014.

(51) Int. Cl.
| | | |
|---|---|---|
| *A01G 15/00* | (2006.01) | |
| *A01G 13/06* | (2006.01) | |
| *A01G 13/02* | (2006.01) | |
| *A01G 7/00* | (2006.01) | |

(52) U.S. Cl.
CPC ............... *A01G 15/00* (2013.01); *A01G 7/00* (2013.01); *A01G 13/0206* (2013.01); *A01G 13/0231* (2013.01); *A01G 13/06* (2013.01)

(58) Field of Classification Search
CPC ............ A01G 13/0206; A01G 13/0231; A01G 13/06; A01G 13/02; A01G 13/0243; A01G 13/04; A01G 13/0293; A01G 13/043; A01G 13/0281; A01G 13/10; A01G 9/16; A01G 9/1438; A01G 9/24; A01G 9/14; A01G 9/242
See application file for complete search history.

(56) References Cited

U.S. PATENT DOCUMENTS

| | | | | |
|---|---|---|---|---|
| 3,800,468 A | * | 4/1974 | de Graff | A01G 13/0231 135/115 |
| 4,404,980 A | * | 9/1983 | Wade | E04H 15/36 135/117 |
| 4,442,626 A | * | 4/1984 | Hammond | A01G 13/0231 135/119 |
| 4,665,646 A | * | 5/1987 | Anderson | A01G 13/043 47/21.1 |
| 4,679,350 A | * | 7/1987 | Banta | A01G 13/0231 47/17 |
| 4,856,227 A | * | 8/1989 | Oglevee | A01G 9/247 47/17 |
| 5,001,859 A | * | 3/1991 | Sprung | A01G 9/1438 47/17 |

(Continued)

*Primary Examiner* — Trinh T Nguyen
(74) *Attorney, Agent, or Firm* — Jason P. Mueller; Adams and Reese LLP

(57) ABSTRACT

Embodiments of the present disclosure provide a humidity and temperature control system for use in the outdoor cultivation of fruits, as typically found in an orchard setting, with the additional aid of a sunshade. Embodiments include a climate control system with an efficient and controlled introduction of water vapor into an outdoor orchard employing a plurality of fogging type nozzles, coupled with an overarching porous solar shade enclosure.

13 Claims, 3 Drawing Sheets

(56) References Cited

U.S. PATENT DOCUMENTS

| | | | |
|---|---|---|---|
| 8,919,037 B1* | 12/2014 | Petran | A01G 9/24 47/17 |
| 2004/0016176 A1* | 1/2004 | Hadar | A01G 13/10 47/31 |
| 2005/0268544 A1* | 12/2005 | Maffei | A01G 13/0231 47/29.1 |
| 2013/0160357 A1* | 6/2013 | Luciano, Jr. | A01G 13/065 47/2 |
| 2018/0177141 A1* | 6/2018 | Lamoureux | A01G 13/0231 |

* cited by examiner

US 10,602,678 B2

ORCHARD CLIMATE CONTROL SYSTEM

CROSS-REFERENCE TO RELATED APPLICATIONS

This application is a Continuation-In-Part of International Patent Application Ser. No. PCT/US2015/0318472, filed on May 20, 2015 which claims the benefit of U.S. Provisional Patent Application Ser. No. 62/001,026, filed on May 20, 2014, both of which are expressly incorporated herein in their entirety by reference hereto.

BACKGROUND OF THE INVENTION

The kiwifruit or 'Chinese Gooseberry,' is the edible berry of a woody vine in the genus *Actinidia*. The kiwifruit is often referred to simply as a 'kiwi.' Kiwifruit can be grown in most moderate temperature humid type climates with adequate summer heat. Most typically, kiwifruit is grown commercially on sturdy support structures or trellises. The kiwi vine can produce several tons per hectare, which is usually more than its rather weak vines can support, without the additional trellises. Conventionally, the trellises can be equipped with a watering system for irrigation and frost protection.

The cultivation of kiwifruit can be challenging away from humid environments. Efforts to grow and produce some of the most desirable varieties of kiwifruit in warmer and drier climates have failed, almost universally. There is a need of an improved cultivation system for kiwifruit, as well as for any delicate fruit variety cultivated in outdoor orchards, which provides a growing environment better suited to these delicate fruit varieties that are subject to damage due to growing conditions outside their narrow optimal range of temperature and humidity.

The following is a disclosure of the present invention that will be understood by reference to the following detailed description taken in conjunction with the accompanying drawings.

DETAILED DESCRIPTION OF SPECIFIC EMBODIMENTS

Figure 1:
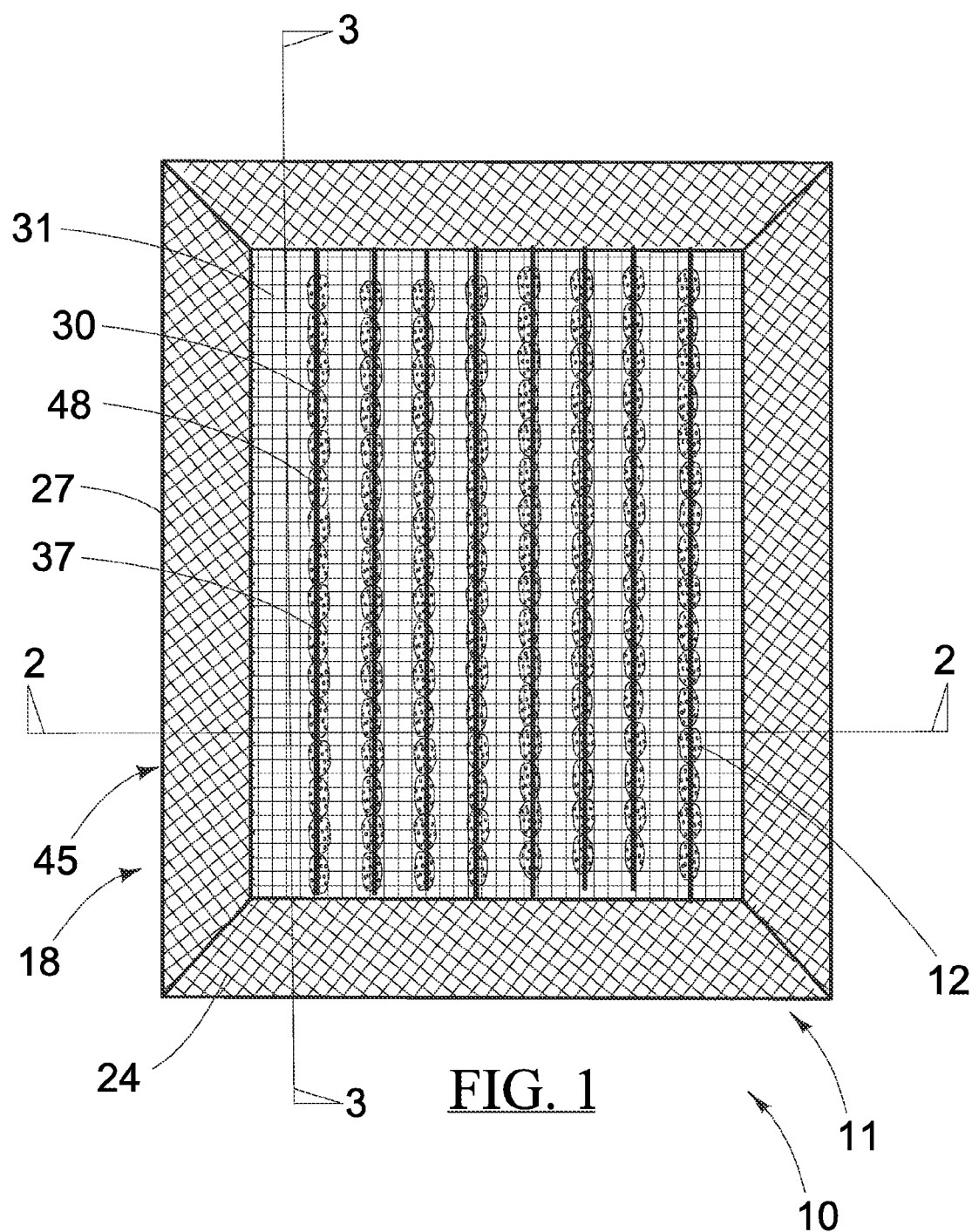
FIG. 1 is a top view of an orchard climate control system, according to an embodiment of the invention.
Figure 2:
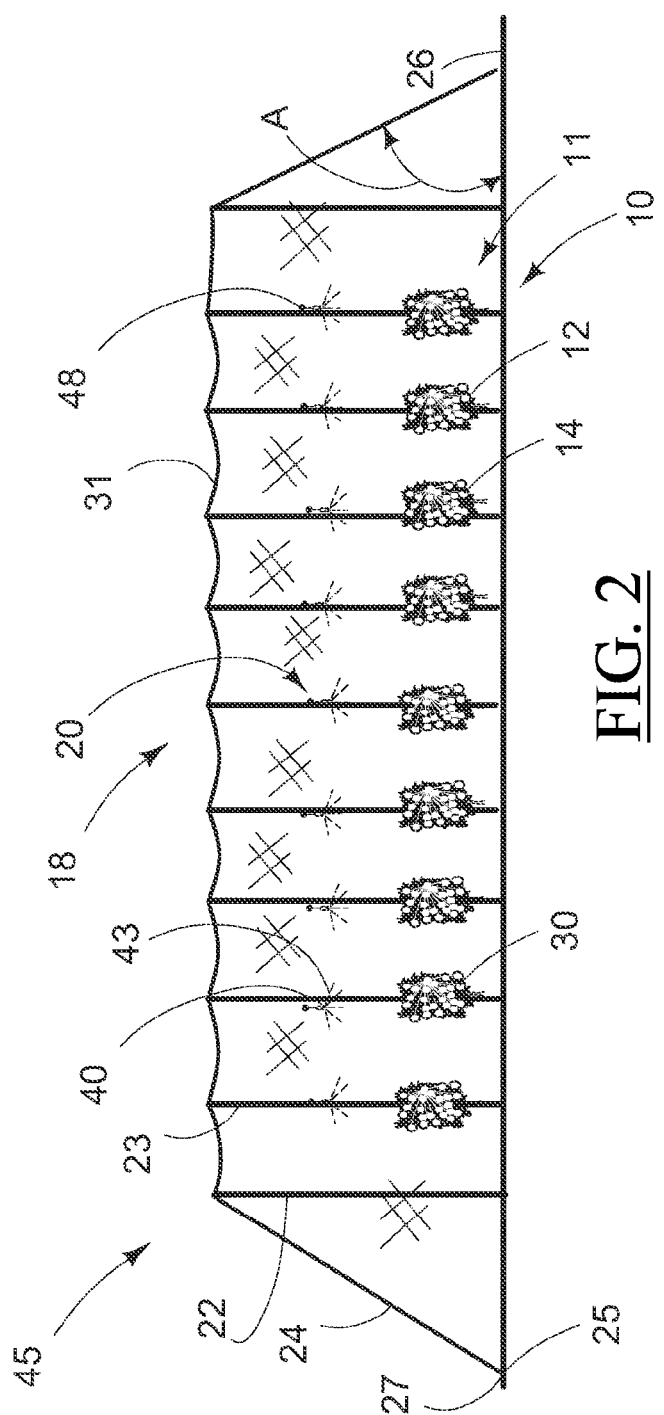
FIG. 2 is a sectioned elevation view of an orchard climate control system, substantially along section line 2-2 of FIG. 1, according to an embodiment of the invention.
Figure 3:
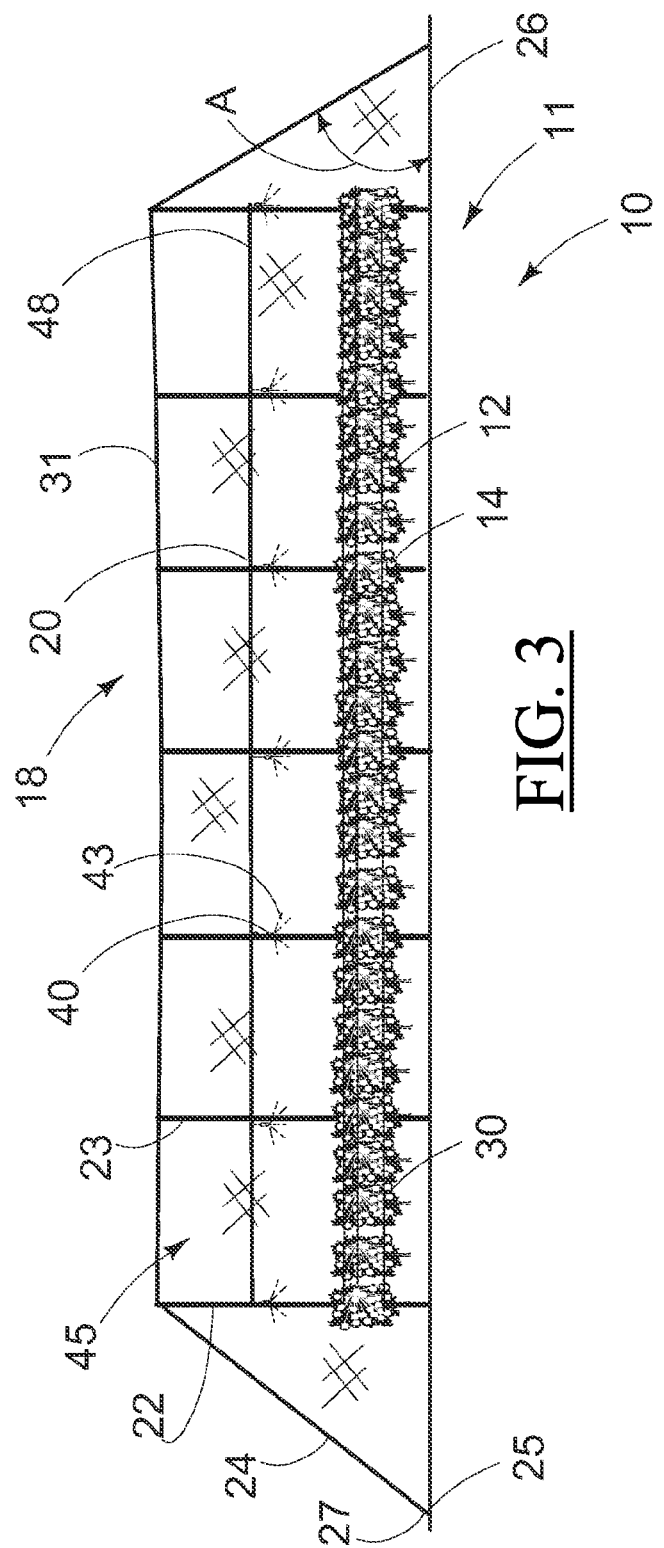
FIG. 3 is sectioned elevation view of an orchard climate control system, substantially along section line 3-3 of FIG. 1, according to an embodiment of the invention.

The invention relates to an orchard climate control system, employing a combination of fogging water vapor nozzles, coupled with sun shades. FIGS. 1 through 3 show the orchard climate control system 10, according to certain preferred embodiments of the present invention. In a preferred embodiment, the orchard climate control system 10 of the present invention is for use in a fruit orchard 11, which may be referred to herein simply as the "orchard." The fruit orchard 11 includes a multiple of fruit vines or trees 12 that produce a fruit 14. For the purposes of the foregoing disclosure, the fruit could be any variety of fruit, which is susceptible to damage or stress from temperature and humidity variance outside its nominal growing conditions. For example, many varieties of kiwis, apples and pome fruits in general, and most varieties of cherries and stone fruits, only thrive under a narrow range of temperature and humidity conditions.

The orchard climate control system 10 of the present invention includes a shade structure 18 comprising a water vapor infusion system 20. A most preferred shade structure 18 is built over the orchard 11, at least partially covering the orchard, and includes a perimeter shade support 22 bordering an internal shade support 23, as shown in the elevation view of FIG. 3. A lateral shade 24 stretches from the perimeter shade support 22 down to a perimeter shade anchor 25, located proximate to a ground surface 26.

Preferably, as shown in FIGS. 2 and 3, the lateral shade 24 is an angled shade that begins at a ground surface 26 at an orchard perimeter 27 and angles upward to the perimeter shade support 22. The angle formed between the ground surface 26 and the angled shade 24, around the perimeter of the orchard is referred to as a Shade Angle "A." The Shade Angle is important in that it serves to better deflect wind, and induce a sustained and desirable ventilation air flow through the shade structure 18. Additionally, the angled shade 24 serves to better filter the incident solar radiation, given that is better oriented at a 'orthogonal' 'normal' or 'right' angle to the sun. Preferably, the Shade Angle is approximately from 45 degrees to 80 degrees, and most preferably at approximately 60 degrees.

The terms "approximately" or "approximate" are employed herein throughout, including this detailed description and the attached claims, with the understanding that the terms denote a level of exactness as typical for the skill and precision in the generally applicable field of technology.

As shown in FIGS. 1 through 3, the shade structure 18 for the orchard climate control system 10 also includes a top shade 31 that is approximately six meters off the ground surface 26. The top shade 31 is substantially horizontal, as shown in FIGS. 2 and 3, and held up by the internal shade support 23, and stretches across the orchard 11 side-to-side, from lateral shade 24 to an opposite lateral shade. Most preferably, the lateral shade 24 and the top shade 31 are made of reflective screen fabrics. In the most preferable embodiment, as shown in FIGS. 1 through 3, the selected top shade 31 serves to block approximately between 15% and 35% of the solar radiation from the orchard 11, preferably 25% of said solar radiation, while the selected lateral shade 24 blocks approximately between 40% to 60% of the incident sun rays, preferably 50% of said incident sun rays.

Besides shade from the sun, another important function of the shade structure 18 is to provide an orchard vapor enclosure 45 for the water vapor infusion system 20 component of the orchard climate control system 10. The coupling of shade control and climate control in an outdoor orchard 11 setting is a development of critical importance to the viable cultivation of delicate, humidity and temperature sensitive fruits, such as the kiwifruit.

The term "humidity," as used herein, refers to the quantity of water present in the air as water vapor. With a fogger 40 as shown in FIGS. 2 and 3, the water vapor infusion system 20 can inject a water vapor fog 43 into the orchard 11, as enclosed within the lateral shade 24 and the top shade 31, which together form the orchard vapor enclosure 45.

In an idealized closed system, a point is reached where it is impossible to add any more water vapor to the system. This is referred to as a saturation point or 100% "Relative Humidity" (RH). Relative Humidity represents the amount of humidity present in the air as a percentage of saturation for that given air temperature and atmospheric pressure.

More water can only be added to saturated air after an equal amount has condensed out of the air. The condensation will occur on the coolest surfaces available, and if no cool surfaces are available then the water vapor fog 43 will condense and fall out as water drops, typically as rain. Again, the maximum possible water vapor content of 100% RH represents saturation of the air and a 0% RH represents absolutely dry air.

For growing plants, humidity control is vital. If humidity too high, plants stop transpiring, and if warm, the stomata of the plant open wide exposing free water that cannot evaporate, and the plant becomes susceptible to diseases and pathogens, especially fungal growth. If humidity is too low, plants close their stomata to try to minimize wilt, which halts absorption of carbon dioxide and slows or stops growth. If the plants dry-out, leaves become hard, and may develop burn scars. Pests typically proliferate as plant stress increases, with the resultant stunting and poor yields often irreversible after severe dry conditions and pest attack.

Plants grown in mild tropical climates need a higher humidity than plants native to arid regions to thrive and produce viable crops. Additionally, due to the ability of warmer air to absorb more water vapor, the higher the arid region's temperature, the higher the amount of water vapor in a given amount of air, to maintain the same Relative Humidity. Another measure of humidity measurement, referred to as "Vapor Pressure Deficit" or VPD, combines both temperature and humidity effects to better reflect the actual lack, or deficit of moisture in the air at any given temperature.

A larger Vapor Pressure Deficit (VPD) number represent increasing dryness of the air, and lower VPD numbers represent increasing moisture or humidity in the air relative to saturated air. For the water vapor infusion system 20 most preferably employed with the orchard climate control system 10 of the present invention, a goal is to maintain a VPD of approximately 2.0 kPa (15 mmHg) or less within the orchard vapor enclosure 45 to avoid dry stress to the fruit vine or tree 12, but preferably more than approximately 1.00 kPa (7.50 mm Hg) to avoid disease problems, especially fungal growth.

The impact of low humidity as realized by a VPD is critical to the growth of delicate fruits such as the kiwi, and a primary benefit of the orchard climate control system 10. Fruit vines or trees 12 cannot photosynthesize and will ultimately perish, if they have to close their stomata to prevent dehydration. Additionally, the efficiency of plant photosynthesis is drastically reduced in higher temperatures at low humidity.

The orchard climate control system 10 of the present invention prevents these undesirable hot and dry conditions in a way that is superior to and is uniquely distinct from a conventional greenhouse system, in that though greenhouses are known to use foggers to cool down air, to increase humidity and to reduce plant stress, taking advantage of the evaporative cooling effect. However, a conventional greenhouse is a closed and sealed system. The orchard vapor enclosure 45 of the present invention includes the shade structure 18, which is substantially porous to water vapor, by design. This porous quality serves to minimize the undesirable and well known "greenhouse effect." The greenhouse effect raises temperature strongly, and tends to generate a hot and water vapor rich environment.

Therefore, in a conventional greenhouse fans are required to expel the hot vapor. Without the relief of the excessive hot and moisture saturated air the greenhouse becomes a breeder for fungus and molds. The temperature within a greenhouse is rarely comparable to ambient temperature. Remarkably, with the orchard climate control system 10 of the present invention the ambient temperature is closely matched, being regular to obtain lower temperatures inside the orchard vapor enclosure 45, for instance, of up to 10° C. less than the ambient temperature. With the orchard vapor enclosure 45 a non sealed system, natural winds and ventilation passes through the shade structure 18 to transport release and remove vapor and heat from within the orchard 11, taking advantage of the evaporative cooling effect for reducing the temperature within the orchard vapor enclosure 45 and controlling the air humidity through the ventilation air flow. The use of the shade structure 18 avoids the undesirable greenhouse effect, and eliminates the need for fans. A very low humidity can be achieved with the shade structure by stopping the operation of the foggers 40 as the orchard enters the cooler afternoon and evening temperatures, thereby avoiding conditions that potentially breed fungus. Additionally, greenhouse systems are very expensive to build and operate especially compared to the installation and operational costs of the orchard climate control system.

The conventional "greenhouse effect" is produced by solar radiation, when solar radiation arrives at the orchard climate control system 10, a significant portion of the incident solar radiation is reflected by the ground surface 26, or the shade structure 18 and the internal orchard vapor enclosure 45, including the vines or trees 12, grass, wires, net and poles. Another portion of the incident solar radiation is absorbed and released as heat. In the greenhouse effect, the reflected radiation from the ground and internal structure and plantings impact a transparent or translucent shell, such as a plastic or glass housing, when it would normally reflect to the sky. When the reflected solar radiation impacts the greenhouse shell, a significant amount of the radiation reflects back to the ground again, converting more of the radiant energy as heat. "Global warming" is attributed to the same green house effect, when radiation that should go to the sky is redirected back to the Earth.

The preferred net material of the shade structure 18 for the orchard climate control system 10 has a high porosity, and the top shade 31 only provides a 30% shade, as preferred, so most of the incident solar radiation reflected by the ground surface 26, or the shade structure 18 and the internal orchard vapor enclosure 45, including the vine 12, grass, wires, net and poles, is released to the sky. Also, the reflective net employed for the lateral shade 24 and importantly, the water vapor fog 43 produced by the foggers 40, both reflect or absorb a significant amount of the incident solar radiation before that radiation arrives to the fruit vines or trees 12, and serve to remove additional heat energy from the orchard 11.

In an embodiment of the orchard climate control system 10 of the present invention, a temperature and humidity sensor coupled with a computer-controller system could be employed to automate the water vapor infusion system 20. The control system would automatically maintain a desired VPD target within the orchard vapor enclosure 45 by regulating the periodicity and duration of the fogger 40 operation as part of the water vapor infusion system 20, which means that the water vapor infusion system operates in controlled ON-OFF cycles. A preferred water vapor infusion system 20 for the present invention employs 4-way directional foggers. Most preferably, the foggers 40 are suspended from a water supply pipe 48 at approximately five meters off the ground surface 26, as shown in FIG. 3. The foggers 40 can run at approximately between 50 to 70 psi, preferably 60 psi, to produce approximately between 55 to 75 micron diameter droplets in a water vapor fog 43, preferably 65 micron or smaller, as shown in FIGS. 2 and 3. It is observed that droplets of that size completely evaporate before they hit the ground surface 26, when they are emitted at the preferred five meters above the ground surface 26.

In a preferred embodiment orchard climate control system 10, as employed in a fruit orchard 11 and shown in FIG. 1, the orchard 11 includes fruit vines or trees 12 planted in a fruit row 30, and supported on a trellis 35. The trellis 35 includes trellis laterals 37, as shown in FIG. 2, which train and support the fruit vines or trees 12. The trellis 35 not only serves to help support the shade structure 18, but also supports the water supply pipe 48 and foggers 40 of the water vapor infusion system 20.

In compliance with the statutes, the invention has been described in language more or less specific as to structural features and method steps. While this invention is susceptible to embodiments in different forms, the specification illustrates preferred embodiments of the invention with the understanding that the present disclosure is to be considered an exemplification of the principles of the invention, and the disclosure is not intended to limit the invention to the particular embodiments described. Those with ordinary skill in the art will appreciate that other embodiments and variations of the invention are possible, which employ the same inventive concepts as described above. Therefore, the invention is not to be limited except by the following claims, as appropriately interpreted in accordance with the doctrine of equivalents.

EXAMPLE

In an implementation of the orchard climate control system according to one of the preferred embodiments a Vapor Pressure Deficit (VPD) of less than 2.0 kPa was obtained. In this case, the orchard climate control system was set to increase the humidity from 20% to 70% at the end of the ON cycle, which results in a relative humidity difference of more than 20% when compared with the environment conditions outside the system, at the end of the ON cycle. The above configuration allows obtaining a temperature reduction of more than 2° C. when compared with the ambient temperature, at the end of the ON cycle.

Depending on some environmental conditions a relative humidity of 90% can be reached, which is the case of installations in places with less wind, high temperatures and dry environment. However, the installation of an orchard climate control system according one of the preferred embodiments also helps in reducing the wind velocity inside the system, being measured to reduce wind velocities from 15 km/hr to 3 km/hr and from 40 km/hr to 15 km/hr, i.e. the wind velocity can be easily reduced a 30%-80% when measured inside the orchard climate control system at a height of 2 m and 50 m from the borders of the system.

Additionally, with the implementation of an orchard climate control system according one of the preferred embodiments, reductions of 40% are reached in the potential evapotranspiration index (ETo). Said ETo was calculated using the Penman-Monteith equation. In addition, at the end of the ON cycle and at noon the difference in the ETo is much higher than in the morning or evening when the system is not working under conditions of low stress. ETo is measured in mm/day, 1 mm/day=10 m$^3$/ha/day of water, normal values observed in a hot, dry day in California are 8 mm, which means that the plant can evaporate 80 m$^3$ of water in a day per hectare. In most of the cases, the ETo is lowered to about 50 m$^3$ with the claimed system, but about 30 m$^3$ of water are required in the foggers. Considering the above, daily ETo is easily reduced by 20% in days of 30° C. and less than 30% RH. At the end of the ON cycle the reduction is probably much higher and more than 50%. With this index is possible to state that the implementation of the claimed system reduces the rate of transpiration of the plant by 20% or more during days of climate stress.

Considering the above, in a kiwi fruit orchard located at Hanford, Calif., USA, a test embodiment of the orchard climate control system according to this application was installed. Temperature and relative humidity environmental variables were measured at the same day and time, outside the system and inside the system, obtaining the following results:

|  | Hot dry day, calm wind | | Hot dry day, moderate wind | |
| --- | --- | --- | --- | --- |
|  | Outside the system | Inside the system | Outside the system | Inside the system |
| Temperature [° C.] | 38.6 | 32.1 | 34.9 | 32 |
| Relative Humidity [%] | 21 | 70 | 19 | 54 |

As can be seen, substantial changes in the measured environmental variables were reached, obtaining reductions in the temperature inside the orchard control system of 6.5° C. when passing from 38.6° C. to 32.1° C. and increasing the relative humidity in a 333% when passing from 21% HR to a 70% HR, in a hot dray day with calm winds. The same measurements made in a similar day but with moderate winds slightly reduce the performance of the system, obtaining a reduction of 2.9° C. and an incrimination of 284% in relative humidity.

The advantages of the orchard control system of this invention are evident in view of the above results, allowing the creation of a controlled environment for improve the yield of an orchard with special requirements, even in locations with unfavorable conditions for said orchard.

LIST OF REFERENCES

10 Orchard climate control system
11 Fruit orchard
12 Fruit vine or tree
14 Fruit
18 Shade structure
20 Water vapor infusion system
22 Perimeter shade support
23 Internal shade support
24 Lateral shade
25 Perimeter shade anchor
26 Ground surface
27 Orchard perimeter
30 Fruit row
31 Top shade
35 Trellis
37 Trellis laterals
40 Fogger
43 Water vapor fog
45 Orchard vapor enclosure
48 Water supply pipe

What is claimed is:
1. An orchard climate control system comprising:
a shade structure built over an orchard, the shade structure including:

a lateral shade and a top shade at least partially covering the orchard, and a perimeter shade support bordering an internal shade support, wherein the lateral shade stretches from the perimeter shade support down to a perimeter shade anchor, located proximate to a ground surface, and wherein the top shade is held up by the internal shade support, stretching across the orchard, wherein the shade structure comprises a material having a high porosity, and the shade structure is substantially porous to water vapor, minimizing the greenhouse effect and allowing natural winds and ventilation to pass through the shade structure to transport, release, and remove vapor and heat from within the orchard, wherein the shade structure defines an orchard vapor enclosure formed by the lateral shade and the top shade, within which a water vapor infusion system is arranged, containing humid air within the vapor enclosure and inducing a desirable ventilation air flow through the shade structure, wherein the material having a high porosity in combination with the water vapor infusion system reduces a temperature within the orchard vapor enclosure and controls an air humidity through the desirable ventilation air flow, wherein the orchard vapor enclosure is a non-sealed structure, wherein natural winds and ventilation pass through the shade structure to transport, release, and remove vapor and heat from within the orchard, controlling the movement of humid air inside the orchard vapor enclosure, wherein the orchard climate control system further comprises at least one of a temperature sensor or a humidity sensor, coupled with a computer-controller system, automating the water vapor infusion system, and wherein the orchard climate control system automatically maintains a desired Vapor Pressure Deficit target within the orchard vapor enclosure by regulating a periodicity and duration of operation of the water vapor infusion system, operating the water vapor infusion system in controlled ON-OFF cycles.

2. The orchard climate control system according to claim 1, wherein the lateral shade and the top shade are made of a reflective screen fabric, wherein the top shade blocks approximately between 15% to 35% of the solar radiation from the orchard, while the lateral shade blocks approximately between 40% to 60% of the incident sun rays.

3. The orchard climate control system according to claim 1, wherein the lateral shade is an angled shade that begins at the ground surface and angles upward to the perimeter shade support.

4. The orchard climate control system according to claim 1, wherein the lateral shade deflects wind, and induces a sustained and desirable ventilation air flow through the shade structure, and also better filters the incident solar radiation, given that is better oriented at an orthogonal angle to the sun.

5. The orchard climate control system according to claim 1, wherein the top shade is approximately six meters off the ground surface, stretching substantially horizontal from the lateral shade to an opposite lateral shade.

6. The orchard climate control system according to claim 1, wherein the desired Vapor Pressure Deficit is approximately 2.0 kPa (15 mmHg) or less within the orchard vapor enclosure.

7. The orchard climate control system according to claim 1, wherein the temperature within the orchard vapor enclosure closely matches the an ambient temperature or is lower than the ambient temperature.

8. The orchard climate control system according to claim 1, wherein the water vapor infusion system includes foggers that inject a water vapor fog into the orchard, enclosed within the orchard vapor enclosure.

9. The orchard climate control system according to claim 8, wherein a reflective net is employed for the lateral shade, which jointly with the water vapor fog produced by the foggers, both reflect or absorb a significant amount of the incident solar radiation before that radiation arrives to fruit vines or trees within the orchard vapor enclosure, and serve to remove additional heat energy from the orchard.

10. The orchard climate control system according to claim 8, wherein the foggers are suspended from a water supply pipe at approximately five meters off the ground surface.

11. The orchard climate control system according to claim 8, wherein the foggers can run at approximately between 50 to 75 psi, preferably 60 psi, to produce approximately between 55 to 75 micron diameter droplets in the water vapor fog, preferably 65 micron diameter droplets or smaller.

12. The orchard climate control system according to claim 1, wherein the orchard includes fruit vines planted in a fruit row, and supported on a trellis, wherein the trellis includes trellis laterals which train and support the fruit vines.

13. The orchard climate control system according to claim 12, wherein the trellis not only serves to help support the shade structure, but also supports a water supply pipe and foggers of the water vapor infusion system.

* * * * *